United States Patent [19]
Lowe

[11] 3,761,826
[45] Sept. 25, 1973

[54] MULTICHANNEL PROGRAMMER

[75] Inventor: Richard Douglas Lowe, Mountain View, Calif.

[73] Assignee: Electronic Associates Inc., Long Branch, N.J.

[22] Filed: Oct. 13, 1972

[21] Appl. No.: 297,236

[52] U.S. Cl. ........................... 328/105, 328/153
[51] Int. Cl. .................... H03k 17/30, H03k 17/76
[58] Field of Search .............. 328/103, 104, 105, 328/153

[56] References Cited
UNITED STATES PATENTS

| | | | |
|---|---|---|---|
| 2,767,312 | 10/1956 | Toulon | 328/105 |
| 3,054,960 | 9/1962 | Pearlman | 328/153 X |
| 3,461,313 | 8/1969 | Hansen | 328/153 X |
| 3,602,826 | 8/1971 | List | 328/103 X |
| 3,675,049 | 7/1972 | Haven | 328/103 X |

Primary Examiner—John S. Heyman
Attorney—Edward A. Petko et al.

[57] ABSTRACT

A multichannel programmer in which the channels are switched on one at a time under the control of a sweep signal. Each channel comprises a comparator (except for the first channel), a NOR circuit, an inverter, a gate and a sample and hold circuit. Each comparator compares an individual threshold with the sweep and the output thereof is applied to the NOR circuit. The other input to the NOR circuit is coupled through an inverter to the comparator output in the next succeeding channel in the sequence. The NOR circuit switches on the gate and the sample and hold from the time the sweep crosses the respective threshold until the sweep crosses the threshold of the next succeeding channel in the sequence.

10 Claims, 4 Drawing Figures

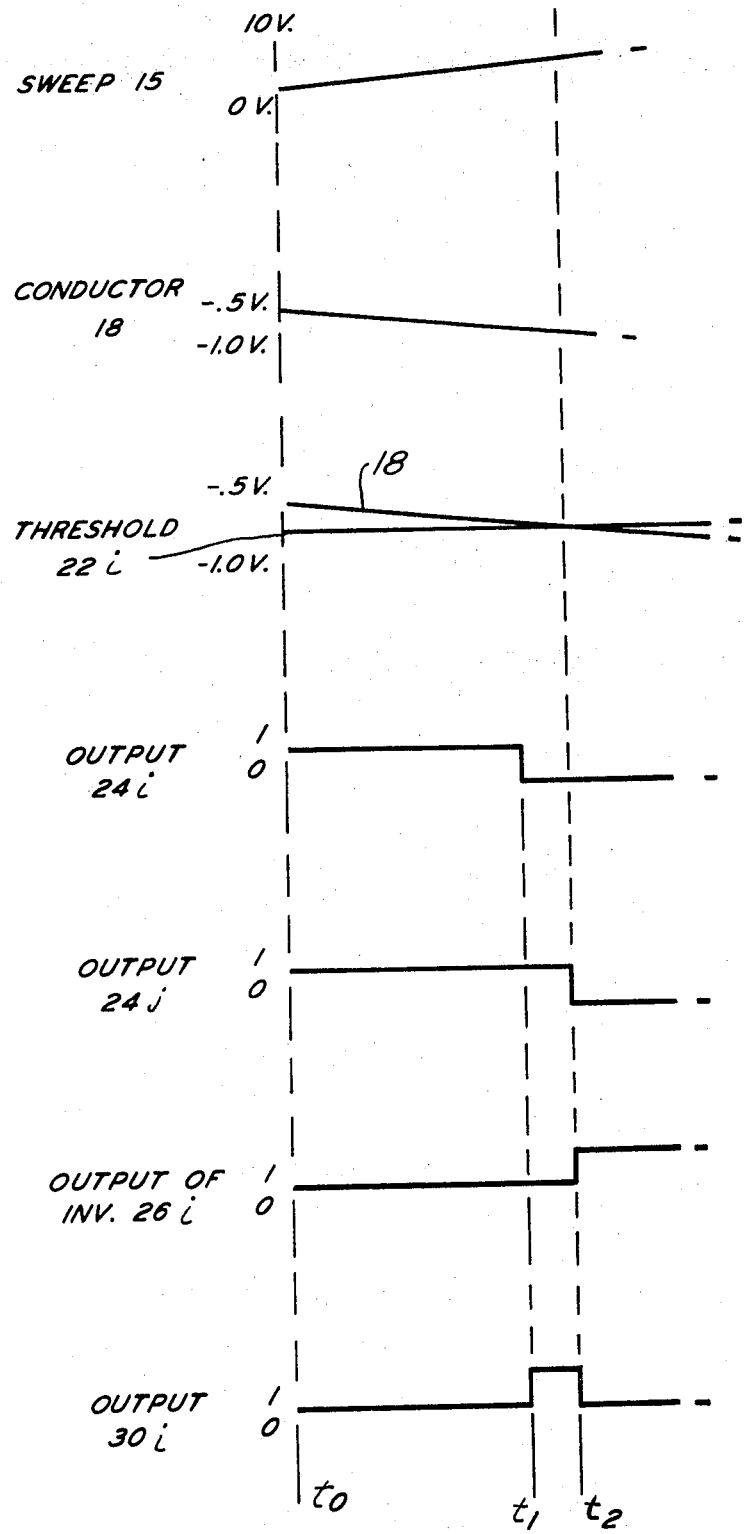

MULTICHANNEL PROGRAMMER

BACKGROUND OF THE INVENTION

1. Field of the Invention

This invention relates to the field of art of multichannel programmers.

2. Prior Art

Known multichannel programmers step sequentially through a plurality of positions and operate at each position on an output signal, for example. One application of such programmers is with quadrupole residual gas analyzers particular ones of which have a programmed input so that an external signal may be used to direct the analyzer to monitor a desired mass number. If such signal is switched between several predetermined values, then the analyzer is able to sequentially monitor several differing mass numbers. The amplitude of each mass number being sequenced may be stored and updated with each scan so that a signal is continuously available for each measured peak. This storage has been only of whole values updated with each sequence and no information has been provided of changes in the peaks between scans. In some prior programmers, the channels have been sequenced in order and the combination of channels represents the normal scan of the quadrupole analyzer. The combination of the channels effectively represents the normal scan of the quadrupole analyzer without a programmer. Thus, some prior programmers have only been useful in eliminating mass peaks or routing peak values to simplify data reduction. Accordingly, such prior programmers have been limited in their method of operation and their application.

Other ones of such programmers have used an internal oscillator whose frequency is counted to a predetermined number. When that count has been reached, a counter is reset and each unique count enables a circuit to drive the quadrupole analyzer and a sample and hold circuit. Such programmers have left much to be desired in that they are free running and control the system operation rather than being controlled. In addition, each channel is required to be turned on for the same period of time and is required to fall in a certain time slot.

SUMMARY OF THE INVENTION

A multichannel programmer in which the channels are connected in a sequence and switched on one at a time under the control of a sweep signal. Each channel except for the first has a comparator which compares a respective threshold signal with the sweep signal. Each channel also has an inverter, a NOR circuit, a gate and a sample and hold circuit. In each channel the output of the comparator is connected to one input of the NOR circuit and an input of the inverter is coupled to the output of the comparator in the next succeeding channel in the sequence. In each channel the inverter output is connected to the other input of the NOR circuit. The NOR circuit supplies a switching signal to turn on the gate and initiate the store function for the sample and hold from the time the sweep signal crosses the respective threshold signal until the sweep signal crosses the threshold signal of the next succeeding channel in the sequence.

BRIEF DESCRIPTION OF THE DRAWINGS

FIG. 2 is an illustration of waveforms helpful in understanding the operation of the programmer of FIGS. 1A-B.

DETAILED DESCRIPTION OF THE DRAWINGS

Figure 1A:
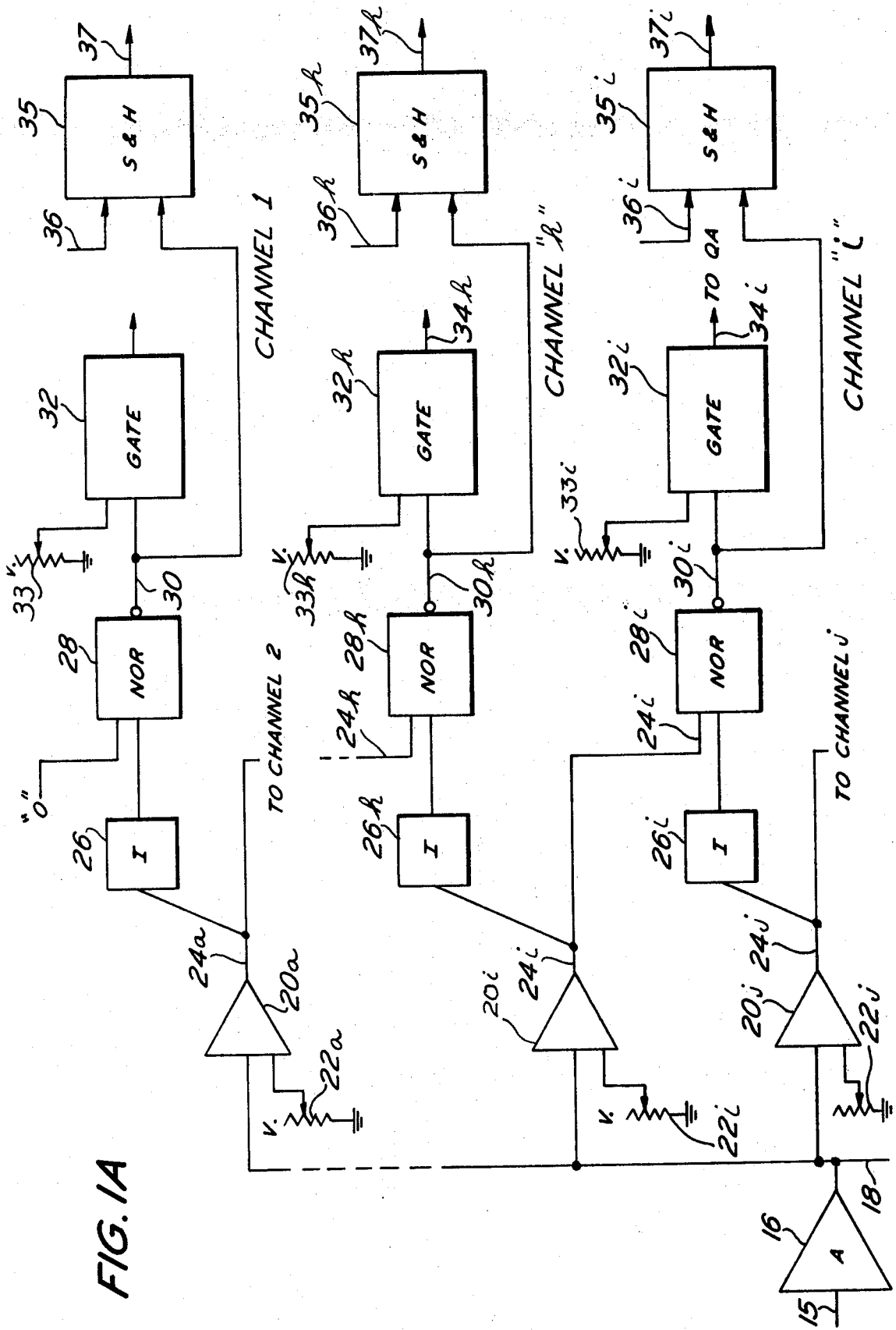
FIGS. 1A-B taken together illustrate a block diagram from a multichannel programmer according to the invention.
Figure 1B:
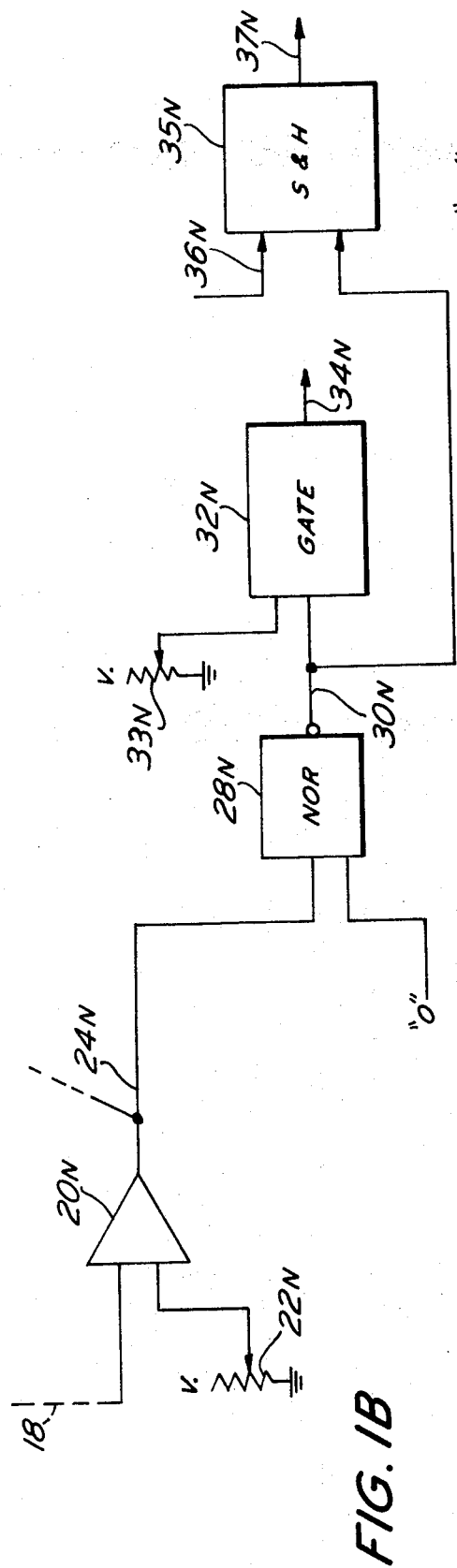

Referring now to FIG. 1, there is shown a programmer 10 adapted to be used with a quadrupole residual gas analyzer such as the "QUAD" manufactured by Electronic Associates, Inc., Scientific Instruments Division. In such quadrupole analyzers, the selection of which ions pass through the quadrupole filter is determined by the magnitude of the RF and DC voltages on the rods of the quadrupole analyzer. As understood by those skilled in the art, there is one set of voltages for each mass number. The magnitude of both of these voltages is controlled by the sum of the center mass and mass range control voltages. In normal operation, the quadrupole analyzer scans through a mass spectrum by continuously varying the mass range voltage in a sawtooth ramp or sweep voltage and superimposing this sweep voltage on a fixed center mass voltage. The quadrupole analyzer monitors a single mass peak by using a fixed center mass voltage with the mass range voltage set to zero.

Programmer 10 has a plurality of channels indicated in FIG. 1 as channels $1 \ldots h, i, j \ldots N$. In a specific application, eight channels may be used. Each channel operates as a separate center mass voltage for the quadropole analyzer. The programmer channels are turned on and off by logic circuits which are controlled by a sweep output of the quadrupole analyzer (not shown). This sweep voltage 15 is independent of the center mass and mass range voltage and is normally fed to an oscilloscope display to drive the beam horizontally.

Sweep 15 is applied through an amplifier 16 which produces on common line 18 a sweep voltage which is shifted and reduced in amplitude as shown in FIGS. 2. The shifted sweep is applied in parallel by way of line 18 to a plurality of comparator circuits 20, 20$i$, $j$ and N. These comparator circuits perform amplitude selection between a voltage variable and a reference voltage. It is to be noted that there is one less comparator circuit for the total number of channels. Thus, if there were eight channels, seven comparator circuits would be required. The components, connections and operation of each of the channels are similar except for some differences in channels $l$ and N, and to begin the description of operation channels $h$, $i$ and $j$ will first be discussed.

The other input to each of the comparator circuits 20-20N is a reference voltage with each reference voltage being set by the operator to control an individual channel threshold or trigger point. For comparator 20$i$, a potentiometer 22$i$ is set to the value indicated in FIG. 2. Comparator 20$i$ compares the reference potential of potentiometer 22$i$ with the shifted sweep so that from times $t_0$ to $t_1$ output 24$i$ is high. It will be understood that the output of the comparator is high when the shifted sweep is less negative than the reference or threshold potential. Output 24$i$ changes state at time $t_1$ when the shifted sweep crosses the reference voltage to produce a fall in voltage as shown in FIG. 2.

Output 24$i$ is coupled through an inverter 26$h$ to one input of a NOR circuit 28$h$. Also, output 24$i$ is coupled directly to one input of a NOR circuit 28$i$ of channel $i$. Potentiometer 22$j$ applies a reference or threshold voltage to comparator 20$j$ so that the output 24$j$ changes state at a time later than $t_1$, viz., time $t_2$ as shown in FIG. 2. This change of state is determined by the setting of potentiometer 22$j$ and the resultant value of the reference voltage.

The output signal at output 24$j$ is inverted by inverter 26$i$ and is applied to the other input of NOR circuit 28$i$. In this manner, output 24$i$ of comparator 20$i$ and the inverted output of comparator 24$j$ are compared in NOR gate 28$i$ which produces a high output only if neither of the inputs is high. At time $t_1$, both of the inputs to NOR 28$i$ are low and thus, a resultant high signal is produced at output 30$i$. This high signal extends until time $t_2$ when comparator 20$i$ changes state since the output of inverter 26 then changes state. The high signal between $t_1$ and $t_2$ at output 30$i$ or NOR 28$i$ is applied (1) to turn on a field effect transistor forming the switching circuit of a gate 32$i$, and (2) to initiate the store function of a sample and hold circuit 35$i$. With gate 32$i$ turned on, its switching circuit is effective to connect the associated voltage source 33$i$ to the center mass circuitry of the quadrupole analyzer. In this manner the analyzer operates about a center mass selected by the potential set by voltage source 33$i$. The output signal of the quadrupole analyzer is applied in parallel to inputs 36–36N of sample and hold circuits 35–35N. Accordingly, when sample and hold circuit 35$i$ is turned on, it is effective to store the output of the quadrupole analyzer during the period from times $t_1$ to $t_2$.

The foregoing sequence and operation is repeated for each succeeding channel with output 24$j$ being directly applied to an input of channel $j$'s NOR circuit until channel N is reached. Channel N is controlled by setting a low (logic 0) level at an input of NOR circuit 28N. Thus, channel N is switched off during the shifted sweep until comparitor 20N changes state as determined by its threshold or reference voltage set by potentiometer 22N.

It will be understood that there is no comparator circuit required for channel 1. The input to NOR circuit 28 of channel 1 is set to a low level. When the sweep begins at time $t_0$, comparator 20$a$ of channel 2 provides a high output which is inverted by inverter 26 so that channel 1 is turned on. Channel 1 is turned off when channel 2 is turned on in the manner previously described and remains off until the beginning of a new sweep.

It will now be understood that programmer 10 may be operated to sequentially switch the output of a quadrupole analyzer thereby to examine the number of mass peaks or mass signals corresponding to the number of channels 1–N. The operator may select the number of differing center mass voltages up to the number of channels provided by the programmer. The switching of the center mass voltages is controlled by the sweep output voltage of the quadrupole analyzer, and the operator is able to display the output of the analyzer in any order. In setting potentiometers 22$a$–22N to produce the reference voltages, the sweep voltage may be divided into any number of segments not exceeding N. While the length of each segment or the value of the display time may be varied, the normal division is in N equal segments. In this manner, programmer 10 allows the operator to use the quadrupole analyzer at the mass values of interest in any order that he chooses. In addition, programmer 10 also provides for the individual recording of each mass value selected or a combined recording of all outputs in a sequential manner.

Instead of sweep input 15, the control signal for programmer 10 may be other RF/DC control signals, pressure or any other similar sweep signals. As previously described, this input control signal is divided into regions of arbitrary size or location by operator adjustable reference potentiometers.

Other applications of programmer 10 may use a quadrupole analyzer in its normal manner with the control being adjusted as necessary while programmer 10 samples, holds and outputs the amplitude of peaks selected by the operator. In this manner, the nature of the quadrupole analyzer is not changed. To accomplish this, an RF/DC control signal or RF/DC feedback signal may be used as the programmer input 15. In addition, one of the reference or threshold values would be adjusted to correspond to the peak of interest. The sample and hold circuit corresponding to that comparator would hold the peak amplitude. If a time signal is fed to programmer 10 and the thresholds are adjusted to correspond to time location of peaks in a gas chromatograph system, the hold output maintained by the sample and hold circuits would reflect the amplitude of various constituents of samples.

Programmer 10 has numerous applications in the analysis of gases. One particular example of an application is in air pollution monitoring. A ratio of sulphur dioxide (amu = 64) may be an indicator of the amount of pollution. Instead of analyzing an entire spectrum or even taking absolute values to perform the analysis, the ratio of these two constituents may be obtained directly by programmer 10. One of the channels is adjusted for mass 28 and another for mass 64. The outputs of these two channels are then applied to a ratiometer by way of respective sample and hold circuits where the ratio between them can be read or recorded directly.

Figure 3:
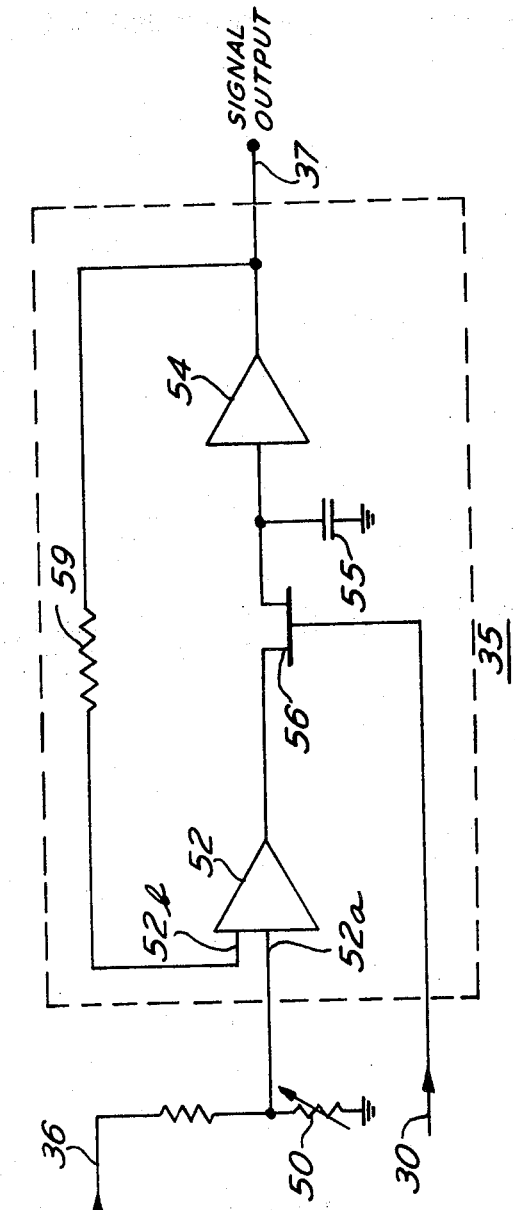
FIG. 3 illustrates in block diagram form and in more detail, one of the sample and hold circuits shown in FIGS. 1A-B.

Since all of the sample and hold circuits 35–35$n$ are the same only of them, circuit 35, need by shown in detail in FIG. 3. Signal 36 of the quadrupole analyzer is applied by way of a level set attenuator 50 to one input 52$a$ of an amplifier 52. The other input 52$b$ has applied thereto a feedback signal from amplifier 54. If a difference exists between the signals at inputs 52$a$–$b$ amplifier 52 adjusts the charge applied to a capacitor 55 when switch 56 is closed. Switch 56 is a field effect transistor connected to output 30 of NOR circuit 28. The foregoing charge adjustment on capacitor 55 is effective to force the difference between the applied input signal and the charge on capacitor to zero. When switch 56 is opened, changes in the applied input signal no longer affect the voltage charge on capacitor 55. Thus, it will be understood that the output of sample and hold circuit 35 is continuously and independently available from programmer 10.

It will be understood that other similarly operating sample and hold circuits may be provided as a module as for example, TO 5 Siliconix switches and National NH 0023.

In a modification of the invention, a set switch may be provided which maintains any one of channels 1–N on with the remaining channels turned off. The set switch may be set for the normal operation previously described. In order to maintain only one channel on, the sweep input is replaced by a negative potential which is inverted by amplifier 16 thereby switching all of the comparators to produce a high output at outputs 24a–N. Since the NOR circuit of each channel compares an inverted comparator output of the preceeding channel with its own comparator output (at a high), each channel is turned off. In order to turn on a selected channel, a positive potential is applied overriding one of the threshold voltages. In this manner there is produced a low output from that comparator, turning on a desired channel.

In a further modification, sample and hold circuits 35–35n may be modified to delay the beginning of the sample time until transients have been damped out.

I claim:

1. A programmer having a plurality of channels connected in a sequence which are switched on one at a time under the control of a sweep signal comprising
    comparator means for each channel except for a first channel having applied thereto a selected threshold signal, each said comparator means for comparing its respective threshold signal with said sweep signal,
    a NOR circuit for each channel having a first and a second NOR input, said first NOR input connected to an output of said comparator means in the same channel,
    inverter means for each channel connected between said second NOR input in the same channel and said output of the comparator means in the next succeeding channel in the sequence, and
    gating and storing means for each channel actuated by a switching signal from said NOR circuit in the same channel whereby for each channel said NOR circuit is effective to turn on said gating and storing means from the time said sweep signal crosses the respective threshold signal until said sweep signal crosses the threshold signal of the next succeeding channel in the sequence.

2. The programmer of claim 1 in which for each channel said gating and storing means includes a sample and hold means in which the store function is initiated during the turn on time.

3. The programmer of claim 1 in which said comparator means provides at said output thereof a first state signal prior to the time of said threshold crossing and a second state signal at the time of said crossing, said NOR circuit providing a switching signal to turn on said gating and storing means only during the time that second state signals are applied to said first and second NOR inputs.

4. The programmer of claim 3 in which the first NOR input of said NOR circuit for said first channel has applied thereto a constant second state signal whereby upon initiation of said sweep signal said NOR circuit produces a switching signal until the threshold is crossed for said comparator means in said second channel.

5. The programmer of claim 3 in which the second NOR input of said NOR circuit for the last channel has applied thereto a constant second state signal whereby said NOR circuit produces a switching signal at the time the threshold is crossed for the comparator means of said last channel.

6. A programmer for a quadrupole analyzer having a plurality of channels connected in a sequence with the channels being switched one at a time under the control of a sweep output voltage of said analyzer comprising
    comparator means for each of said channels except for a first channel having applied thereto an individual predetermined threshold signal, each of said comparator means for comparing its individual threshold signal with said sweep signal for producing (1) a first state signal at an output of said comparator means prior to the time that said sweep signal crosses said threshold signal and (2) a second state signal at the time of crossing,
    a NOR circuit for each of said channels having a first and second input, said NOR circuit producing a switching signal when second state signals are applied to both said first and second NOR inputs, said first NOR input being connected to said comparator means output in the same channel,
    an inverter circuit for each of said channels connected between said second NOR input in the same channel and said comparator means output in the next succeeding channel in the sequence, and
    gating means and sample and hold means for each channel connected to an output of said NOR circuit in the same channel for turning on said gating means and initiating the store function for said sample and hold means upon application of said switching signal which occurs between the time of crossing said threshold signal in the same channel and crossing said threshold signal in the next succeeding channel.

7. The programmer of claim 6 in which said gating means of each of said channels is connected to the center mass circuitry of said quadrupole analyzer, each said gating means having an individual voltage source set to a predetermined voltage whereby the predetermined voltage of the gating means which is turned on is applied to said quadrupole analyzer which operates about a center mass determined by said predetermined voltage.

8. The programmer of claim 7 in which an output signal of said quadrupole analyzer is applied to all of said sample and hold means whereby only the sample and hold means in the store function samples the output of said analyzer.

9. The programmer of claim 6 in which the first NOR input of said NOR circuit for said first channel has applied thereto a constant second state signal whereby upon initiation of said sweep signal said NOR signal circuit produces said switching signal until the threshold signal is crossed for said comparator means in said second channel.

10. The programmer of claim 9 in which the second NOR input of said NOR circuit for the last channel has applied thereto a constant second state signal whereby said NOR circuit produces a switching signal at the time the threshold signal is crossed for the comparator means of said last channel.

* * * * *